(12) United States Patent
Filart

(10) Patent No.: US 10,097,594 B1
(45) Date of Patent: Oct. 9, 2018

(54) RESOURCE-MANAGED CODEC SELECTION

(71) Applicant: T-Mobile USA, Inc., Bellevue, WA (US)

(72) Inventor: Homer Nicolas B. Filart, Renton, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 15/692,251

(22) Filed: Aug. 31, 2017

(51) Int. Cl.
*H04M 3/493* (2006.01)
*H04L 29/06* (2006.01)

(52) U.S. Cl.
CPC ...... *H04L 65/1069* (2013.01); *H04L 65/1006* (2013.01); *H04L 65/1016* (2013.01); *H04L 65/1023* (2013.01); *H04L 65/601* (2013.01); *H04L 69/04* (2013.01)

(58) Field of Classification Search
CPC .................................................. H04L 65/1069
See application file for complete search history.

(56) References Cited

U.S. PATENT DOCUMENTS

2016/0041993 A1* 2/2016 Maynard ........... G06F 17/30076
707/809
2018/0048748 A1* 2/2018 Lundstrom ......... H04M 1/2535

OTHER PUBLICATIONS

"3GPP TS 23.334 V10.2.0", 3rd Generation Partnership Project, Valbonne, France, Sep. 2011, 59 pages.

* cited by examiner

*Primary Examiner* — Justin Lee
(74) *Attorney, Agent, or Firm* — Lee & Hayes, PLLC

(57) ABSTRACT

During call setup in a communication system, first and second communication terminals may negotiate regarding which codecs to use for a streaming media session. In some cases, the first communication terminal may support a prioritized codec that has been designated for preferential use. In cases where the second communication terminal does not support the prioritized codec, a serving network may nevertheless select the prioritized codec for media communications with the first communication terminal, and may perform transcoding between the prioritized codec and a non-prioritized codec that has been selected for use with the second communication terminal. For newly initiated sessions, however, the serving network may determine the amount of resources that are available for transcoding. When there are limited resources, the serving network may opt to not use the prioritized codec in the situation described above, and may instead use a non-prioritized codec for end-to-end communications, without transcoding.

20 Claims, 12 Drawing Sheets

RESOURCE-MANAGED CODEC SELECTION

BACKGROUND

Mobile communications are increasingly provided by packet-based communication systems rather than legacy circuit-switched systems. A communication infrastructure known as IMS (IP multimedia subsystem), for example, is often used within cellular communication systems for providing voice, video, and other types of communications.

For certain types of communications, media such as audio and video are transferred in real time between communication terminals. For a voice call, as an example, a voice terminal captures an analog audio signal, converts the analog audio signal to a digital data stream, compresses the digital data stream in a process referred to as coding or encoding, and transmits the compressed digital data stream to another voice terminal. The receiving voice terminal receives the compressed digital data stream, decompresses the digital data stream in a process referred to as decoding, and converts the decompressed data stream to an analog signal to drive an amplifier and/or loudspeaker.

The coding and decoding use an algorithm that compresses and decompresses a digital media stream in accordance with an agreed upon media coding standard, so that the compressed media stream is in a corresponding audio coding format. The algorithm and/or the computer code implementing the coding and encoding is referred to as a codec.

For a given media type such as audio, there may be many different codecs, each of which implements a corresponding audio coding standard. Different devices may support different codecs, and translation between data streams of different coding formats may at times be performed. Translation such as this, from one coding format to another coding format, is referred to as transcoding.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
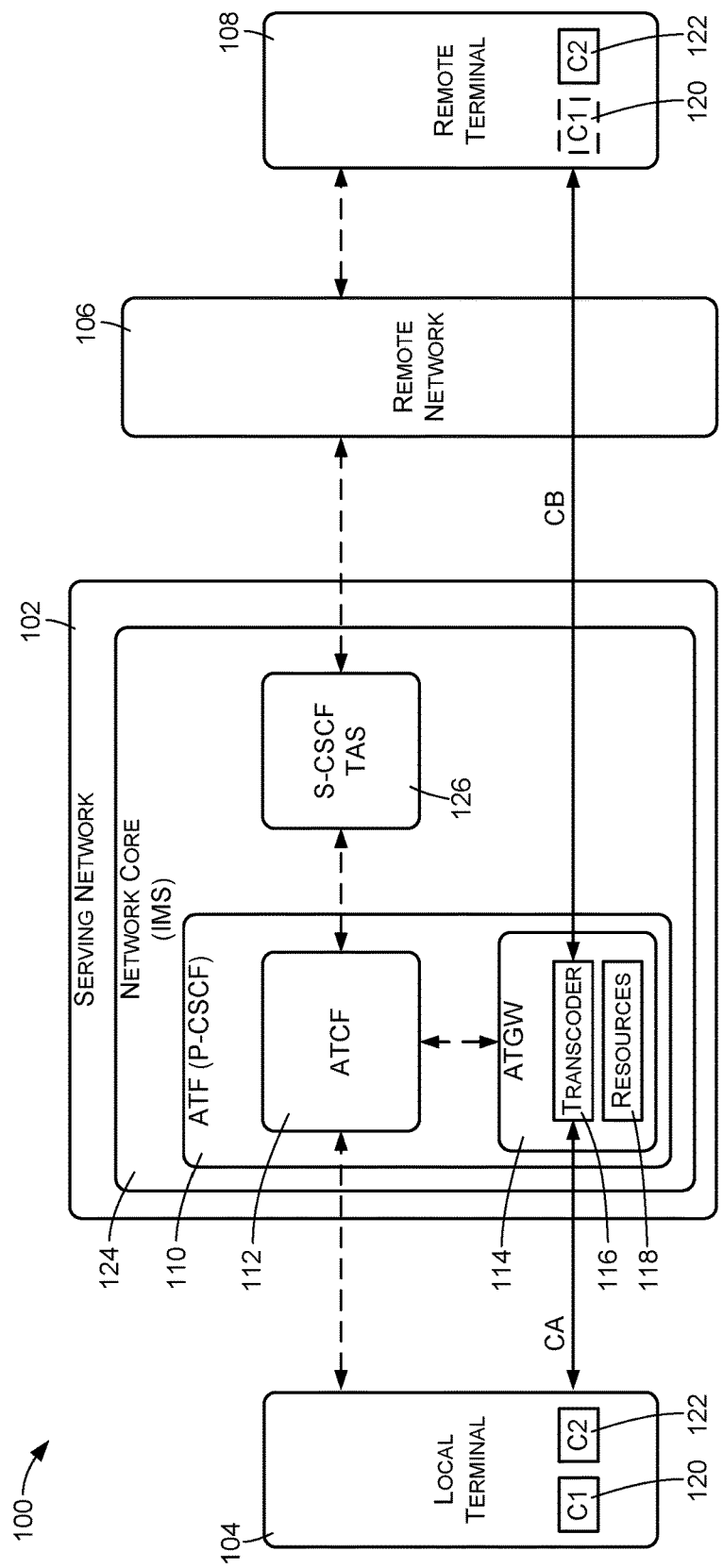
FIG. 1 is a block diagram of a mobile communication system, showing certain components that are relevant to media streaming and codec selection.

The described implementations provide devices, systems, and methods for selecting media coding formats for use in voice calls and other communication sessions that involve streaming media. In the environment described herein, a first communication terminal has capabilities that include support for multiple coding formats. One of the formats is prioritized over the other formats because of advantages such as higher bandwidth, greater efficiency, lower packet losses, and/or other characteristics.

When setting up a call between the first communication terminal and a second communication terminal, the prioritized coding format is used when possible for end-to-end communications between the terminals, and there is no need for transcoding. Assuming that the first terminal supports the prioritized format, this means that the prioritized format is used for end-to-end communications in situations where the second terminal supports the prioritized format.

For situations in which the second terminal does not support the prioritized format, the best available coding format is generally selected for media communications with the second terminal. Nevertheless, the first terminal may use the prioritized format in some situations, with transcoding being used to convert between the prioritized format used by the first terminal and the other format used by the second terminal.

A wireless communications network such as an IP Multimedia Subsystem (IMS) network has an access transfer function that is provided to anchor media sessions, to negotiate session parameters and media attributes such as which coding formats to use, and to perform transcoding as needed. In certain situations, the access transfer function is configured to use the best available coding formats for communicating media between the first terminal and the second terminal. That is, the best coding format supported by the first terminal is selected for media communications with the first terminal, the best coding format supported by the second terminal is selected for media communications with the second terminal, and transcoding is performed whenever these coding formats differ. This allows the advantages of a prioritized format to be obtained for media communications with the first terminal, even though the second terminal does not support the prioritized format. The use of a prioritized codec in this manner, when the prioritized codec is not supported by one of the terminals but there is another format that is supported by both terminals, may be referred to at times as proactive coding/decoding or proactive transcoding.

Transcoding uses significant amounts of computational resources. In some situations, the computational resources may be limited, and transcoding may threaten to exhaust the computation resources. This may result in dropped calls or crashes due to an inability to meet the transcoding needs and other needs of existing communication sessions and subsequently established communication sessions.

In a described embodiment, the access transfer function or some other network component is configured to check the amount of available computational resources before allowing proactive transcoding. Proactive transcoding is allowed when the current load on the computational resources is less than a predetermined threshold. When the load is equal to or greater than the threshold, proactive coding/decoding is disallowed for new sessions. This reduces the chances of overloading available computational resources.

FIG. 1 shows relevant elements of a mobile communication system 100 in which the described techniques may be implemented. In certain implementations, for example, the mobile communication system 100 may comprise a cellular communication system comprising multiple geographically dispersed base stations that provide radio communications with multiple mobile devices.

The system 100 has a serving network 102 that supports and serves a first communication terminal 104. The system 100 also has a remote network 106 that supports and serves a second communication terminal 108. Each of the networks 102 and 106 may comprise, as an example, an IP Multimedia Subsystem (IMS) communications network.

The components shown in FIG. 1 represent relevant logical functionality, which is typically implemented by computing devices such as computer servers. In practice, the serving network 102 will have various other components and functions as defined by various standards.

The communication terminals 104 and 108 may comprise voice terminals or other audio terminals for voice communications, and/or video terminals for video communications. Examples of communication terminals include mobile computing or communication devices, smartphones, telephone handsets, headsets, wearable devices, computers, personal computers, desktop computers, laptop computers, tablet computers, etc. The communication capabilities of the terminals 104 and 108 may include Wi-Fi capabilities, cellular or other telephony capabilities, and/or other wired or wireless network communication capabilities.

The networks 102 and 106 communicate with each other so that media sessions can be conducted between users and terminals of the two networks. In the context of FIG. 1, a voice call, video call, or other media communication session that is initiated by the first terminal 104 to the second terminal 108 is referred to as a mobile originating call. A call or other media communication session that is initiated by the second terminal 108 to the first terminal 104 is referred to as a mobile terminating call. Note that as used herein, the term "call" may describe different types of media communication sessions, including audio and video communications sessions.

Various communications are described below from the perspective of the serving network 102, with respect to which the first terminal 104 will be referred to as the local terminal 104 and the second terminal 108 will be referred to as the remote terminal 108.

The serving network 102 may have an access transfer function (ATF) 110, which is part of or is co-located with a Proxy-Call Session Control Session (CSCF). The ATF 110 supervises media communications originating from or terminating at the local terminal 104. For example, the access transfer function 110 may negotiate with the remote network 106 regarding selection of coding formats for media communications. In addition, the access transfer function 110 may anchor media streams, such as audio and video streams, and provide transcoding of media streams. The local terminal 104 communicates with the access transfer function using the Session Initiation Protocol (SIP).

In certain embodiments such as LTE networks, the access transfer function 110 may comprise an Access Transfer Control Function (ATCF) 112 and an Access Transfer Gateway (ATGW) 114. The ATCF 112 may be referred to in some embodiments as media gateway controller (MGC) or application level gateway (ALG). The ATGW 114 may be referred to in some embodiments as a Media Gateway (MG or MGW) or Access Gateway (AGW).

The ATCF 112 is in the control plane of the serving network 102. Accordingly, communications with the ATCF 112 are for purposes of control rather than media transfer. Dashed lines are used to indicate paths of control communications. Control plane communications between the ATCF 112 and the ATGW 114 use what is referred to at the Gateway Control Protocol or H.248 protocol.

The ATGW 114 is in the user plane of the serving network 102. Media streams are conveyed through the ATGW 114 between the local terminal 104 and the remote terminal 108, as indicated by solid lines.

The ATGW 114 has one or more transcoders 116. The term "transcoder" refers to an algorithm or software component that translates between two media coding formats, using respectively corresponding codecs.

The ATGW 114 has computational resources 118, which may include digital signal processors (DSPs) and/or other processors and associated resources that are used for transcoding, and in some cases for other purposes as needed by the ATGW 114, the access transfer function 110, and possibly other components of the serving network 102.

For purposes of discussion, it will be assumed that the local terminal 104, which is served by the serving network 102, supports a set of codecs that includes a first, prioritized codec 120 and a second, non-prioritized codec 122. It will be assumed that the remote terminal 108, which is served by the remote network 106, supports either one or both the prioritized codec 120 and the non-prioritized codec 122.

In FIG. 1 and in the following discussion, the prioritized codec 120 is referred to as codec C1 or in some cases as C1. The non-prioritized codec 122 is referred to as codec C2 or simply as C2.

The term "prioritized" is used in a relative sense to indicate that when a choice is available between two or more codecs, a prioritized codec will be selected over a non-prioritized codec. More generally, entities of the system 100 may rank available codecs in an order of priority, and select a higher-priority codec over any lower-priority codecs.

Each codec implements a corresponding media coding method. As an example, the prioritized codec C1 may implement Enhanced Voice Services (EVS) coding and decoding, using an EVS codec. The non-prioritized codec C2 may implement a version of Adaptive Multi-Rate (AMR) coding and decoding, using an AMR codec. EVS is a wideband speech audio coding standard having various advantages relative to the AMR coding standard. For example, EVS coding/decoding may provide wider bandwidths, better protections against packet loss, better noise cancellation, higher compression, etc., in comparison to AMR coding/decoding. Note that AMR has several variations, including versions of AMR-NB (AMR narrowband) and AMR-WB (AMR wideband), and that the acronym AMR is intended to encompass any or all of the available variations.

In practice, either terminal may support multiple non-prioritized codecs, of which the illustrated non-prioritized codec C2 is an example. For example, either terminal may support both AMR-NB and AMR-WB, both of which may be considered to be non-prioritized relative to EVS.

The serving network 102 may have a network core 124, which may be an IP Multimedia Subsystem (IMS) core, as an example. The network core 124 has various components, including a CSCF and TAS, shown in FIG. 1 and referred to herein as CSCF/TAS 126. The access transfer function 110 may be part of the network core.

For a mobile originating call, the local terminal 104 (the calling party in this situation) communicates with the ATCF 112 using SIP to initiate the call. The ATCF 112 communicates with the remote network 106 and/or the remote terminal 108 (the called party in this situation) through the CSCF/TAS 126 of the network core 124 and provides a list of one or more codecs (referred to offered codecs) that can be used during the call. The remote terminal 108 selects one of the codecs and returns this selection to the ATCF 112. The ATCF 112, in conjunction with the ATGW 114, then selects a codec for communicating with the local terminal 104. The two codecs used respectively by the local terminal 104 and the remote terminal 108 may be the same or may be different than each other. In the case that the codecs are different, the transcoder 116 is used to transcode between the two corresponding coding formats, using the computational resources 118.

For a mobile terminating call, the remote terminal 108 (the calling party in this situation) communicates through the remote network 106 with the serving network 102 using SIP to initiate the call and to provide a list of one or more codecs (offered codecs) that the remote terminal 108 supports. The ATCF 112 receives the request and communicates the list of offered codecs to the local terminal (referred to as the called party in this situation). The local terminal 104 selects one of the offered codecs and returns that selection to the ATCF 112. The ATCF, in conjunction with the ATGW 114, selects a codec to be used by the remote terminal 108, and instructs the remote terminal of this selection. As with the mobile originating call, the two codecs used respectively by the local terminal 104 and the remote terminal 108 may be the same or may be different than each other. In the case that the codecs are different, the transcoder 116 is used to transcode between the two corresponding coding formats, using the computational resources 118.

More detailed call flows will be described in the following discussion.

Note that FIG. 1 shows components that are involved in a particular aspect of call setup, and there may be other communications involved in setting up a call. In addition, other components and/or functions that are not shown may be involved in call setup.

Figure 2:
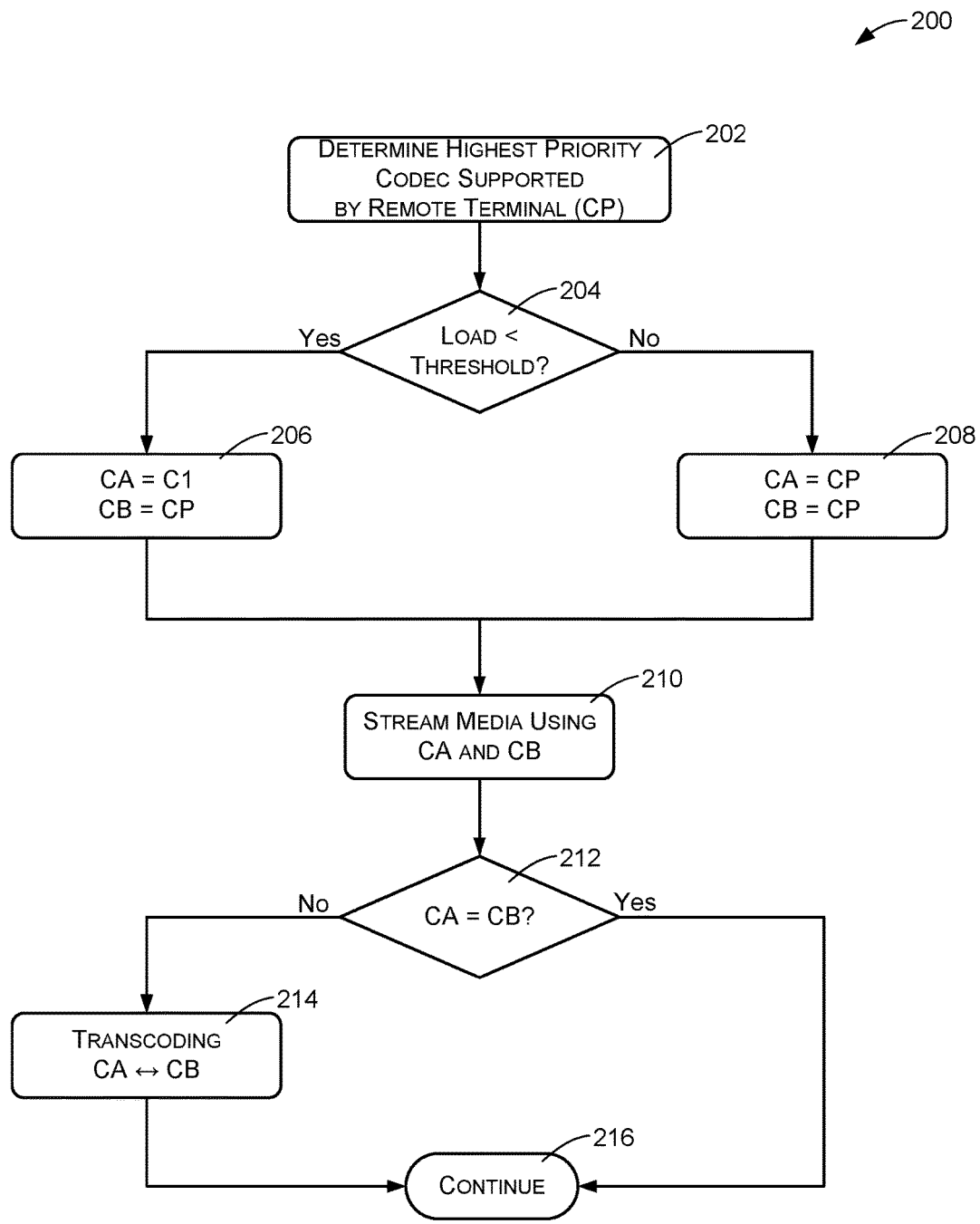
FIG. 2 is a flow diagram illustrating an example method of selecting codecs for local and remote communication terminals.

FIG. 2 illustrates an example method 200 for selecting a codec for each of two communication terminals during a media session such as a voice call. FIG. 2 will be described in relation to system of FIG. 1, and communications will be described with reference to the serving network 102 and access transfer function 110 of FIG. 1. The prioritized codec 120 and the non-prioritized codec 122 will be referred to as codecs C1 and C2, respectively, or more simply as C1 and C2. It is assumed herein that the local terminal 104 supports both C1 and C2 and that the remote terminal 108 supports C2. The remote terminal 108 may or may not support the prioritized codec C1. In FIG. 2, CA is a variable representing the codec that is ultimately selected for use with the local terminal 104 and that is used to stream data between the local terminal 104 and the serving network 102 during a call. CB is a variable representing the codec that is selected for use with the remote terminal 108 and that is used to stream data between the remote network 106 and the serving network 102 during the call. In the described embodiment, the example method 200 is performed at least in part by the components of the system 100 as shown in FIG. 1.

An action 202 comprises determining the most highly prioritized codec supported by the remote terminal 108, which is referred to in FIG. 2 using the variable CP. In this example, the most highly prioritized codec supported by the remote terminal 108 may be either C1 or C2. If the remote terminal 108 supports the codec C1, C1 is selected as CP. If the remote terminal 108 does not support the codec C1, C2 is selected as CP.

The access transfer function 110 then performs an action 204 of determining whether the existing load on the computational resources 118 is less than a threshold load, where the threshold is set at a value of less than 100% of the capacity of the computational resources 118. In some cases, this may be performed by determining a metric representing the existing load of the computation resources 118, which may be based on the number of processes being executed, the number of threads being executed, the number of processor cycles being used, the amount of used memory or cache, etc. These various factors may be combined and converted to a fraction or percentage representing the current load and/or the current availability of the computational resources 118 relative to their full capacity. Either the current load or the current availability may be compared to a predetermined threshold in the action 204. Current availability may at times correspond to capabilities that are currently idle or unused.

If the load is less than the threshold or the available resources are equal to or greater than the threshold, an action 206 is performed. In the action 206, the prioritized codec CP is selected as CA for use with the local terminal 104, and the most highly prioritized codec CP is selected as CB for use with the remote terminal 108.

If in the action 204 the load is greater than or equal to the threshold or the available resources are less than the threshold, an action 208 is performed. In the action 208, the most highly prioritized codec CP is assigned to both CA and CB, for use in streaming with both the local terminal 104 and the remote terminal 108.

After the action 206 or the action 208, an action 210 is performed of streaming the media using the codecs CA and CB, where CA is used between the serving network 102 and the local terminal 104, and CB is used between the serving network 102 and the remote network 106.

The block 212 represents a decision regarding whether CA is equal to CB. If CA is not equal to CB, an action 214 is performed of transcoding the media stream between CA and CB. Otherwise, if CA is equal to CB, no further actions are performed and streaming is performed without transcoding, as indicated by the block 216.

Tables 1 and 2 below illustrate codec selections for CA and CB resulting from the method 200 in situations where (a) possible codecs are C1 and C2, (b) C1 is the prioritized codec, and (c) the local terminal 104 supports both C1 and C2. Table 1 shows selections that are made when resource loading is less than the threshold. Table 2 shows selections that are made when resource loading is equal to or greater than the threshold.

TABLE 1

| Loading < Threshold | | | | |
|---|---|---|---|---|
| Local Capabilities | Remote Capabilities | CA | CB | Transcoding |
| C1 and C2 | C1 and C2 | C1 | C1 | No |
| C1 and C2 | C1 | C1 | C1 | No |
| C1 and C2 | C2 | C1 | C2 | Yes |

TABLE 2

| | | Loading ≥ Threshold | | | |
|---|---|---|---|---|---|
| Local Capabilities | Remote Capabilities | CA | CA | Transcoding | |
| C1 and C2 | C1 and C2 | C1 | C1 | No | |
| C1 and C2 | C1 | C1 | C1 | No | |
| C1 and C2 | C2 | C2 | C2 | No | |

Note that there may be other situations where transcoding is used, such as when there is no common codec supported by both of the communication terminals.

FIGS. 3-8 show high-level call flows that may occur in certain embodiments for initiating call sessions and for implementing the example method 200. In FIGS. 3-8, communicating components or entities are listed along the top, with a corresponding vertical line extending downward. Communications are indicated by arrows that extend from and to the vertical lines corresponding to the entities from which the communications originate and terminate, respectively. Communications occur in order from top to bottom. An individual communication or set of communications is indicated by a corresponding reference numeral along the left side of the figure, horizontally aligned with the arrow or arrows representing the communication.

FIGS. 3-8 illustrate the most relevant communications and may omit other communications that occur in practice but that are less relevant to the topics at hand Such other communications may include communications that both precede and follow the illustrated communications, communications that occur in time between the illustrated communications, and communications that occur between components or entities that are not specifically shown.

All of FIGS. 3-8 assume that the local terminal 104 supports both C1 and C2.

Generally, the call flows of FIGS. 3-8 involve passing lists of available codecs between entities, where each entity has the opportunity to modify one or more of the lists. For purposes of discussion, a list of available codecs is indicated within parentheses, such as (C1, C2), which indicates that both C1 and C2 are available or being offered. Communications between the ATCF and ATGW, conducted using the H.248 protocol, include two lists: a list of codecs corresponding to the local terminal 104 and a list of codecs corresponding to the remote terminal 108. These lists are differentiated by the prefixes "Local:" and "Remote:" in FIGS. 3-8. For example, the list (Local:C1,C2) indicates that both C1 and C2 may be available or are offered for use by the local terminal 104. As another example, the list (Remote: C2) indicates that only C2 is available or being offered for use in communicating with the remote terminal 108.

Figure 3:
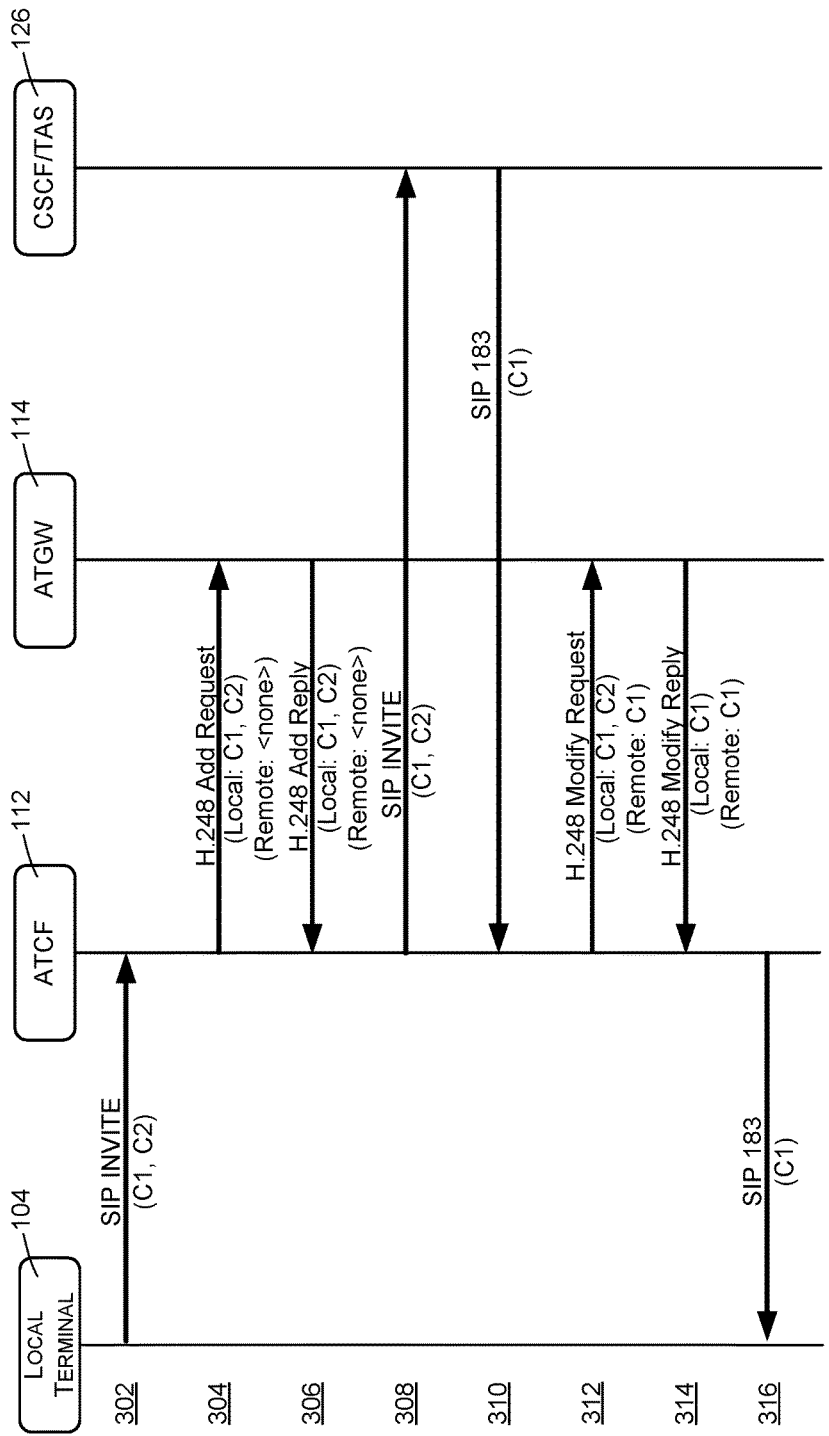
FIGS. 3-8 are call flow diagrams illustrating example call flows for codec selection between two communication terminals.

FIG. 3 illustrates communications when initiating a mobile originating call, in situations where the remote terminal 108 supports C1. In this example, the resource loading can be equal to the threshold, below the threshold, or above the threshold. Although not indicated in FIG. 3, the remote terminal 108 may in some instances also support C2 and/or other non-prioritized codecs, in addition to the prioritized codec C1.

At 302, the local terminal 104 sends a Session Initiation Protocol (SIP) INVITE request to the serving network 102. The SIP INVITE request has a list specifying that the local terminal 104 supports both C1 and C2. For example, the SIP INVITE may have a Session Description Protocol (SDP) payload that specifies C1 and C2 as media attributes. In response to the SIP INVITE, the local terminal 104 expects a SIP response specifying a selection of one of the offered codecs.

The SIP INVITE is received by the ATCF 112, which responds at 304 by sending an H.248 Add request to the ATCF 112 to specify terminations for the call. The Add request includes a list that enumerates the codecs that the local terminal 104 has selected or offered and the codecs that have been selected or offered for use in communicating with the remote terminal 108. In this case, the list for the local terminal 104 includes C1 and C2, as specified by the preceding SIP INVITE. The list for the remote terminal 108 is empty, indicated by <none>, because the remote terminal 108 has not yet been queried.

At 306, the ATCF 112 responds with an H.248 Add reply that returns the enumerated local and remote lists as they were received, unchanged. That is, the local list specifies C1 and C2 and the remote list specifies <none>.

At 308, the ATCF 112 forwards the SIP INVITE to the CSCF/TAS 126, again specifying the codecs C1 and C2 that were indicated as being supported by the local terminal 104. The presence of both C1 and C2 in the SIP INVITE indicates that either C1 or C2 can be used for communications between the serving network and the remote terminal. The CSCF/TAS 126 responds by interacting with the remote network 106 and the remote terminal 108 in order to select or identify one of the codecs specified by the SIP INVITE.

At 310 the CSCF/TAS returns a SIP 183 message (i.e., a session progress message) to the ATCF 112 in reply to the previously received SIP INVITE, specifying the single codec that has been selected for communications through the remote network 106 with the remote terminal 108. The SIP 183 message specifies a selection of C1, which is the best available codec supported by the connection to the remote terminal 108.

At 312, the ATCF sends an H.248 Modify request to the ATCF 112, specifying the local list, which is as yet unchanged and includes both C1 and C2. However, the remote list is modified to specify only C1, as indicated by the preceding SIP 183 message from the CSCF/TAS 126.

At 314, the ATCF 112 returns a Modify reply to the ATCF 112. In this case, the local list has been modified by removing C2, and by specifying only C1. The remote list is left unchanged so that it contains only C1, honoring the selection received from the CSCF/TAS at 310.

At 316, the ATCF 112 returns a SIP 183 message to the local terminal 104, specifying only C1, as an indication that C1 has been selected for communications between the ATGW 114 and the local terminal 104.

Figure 4:
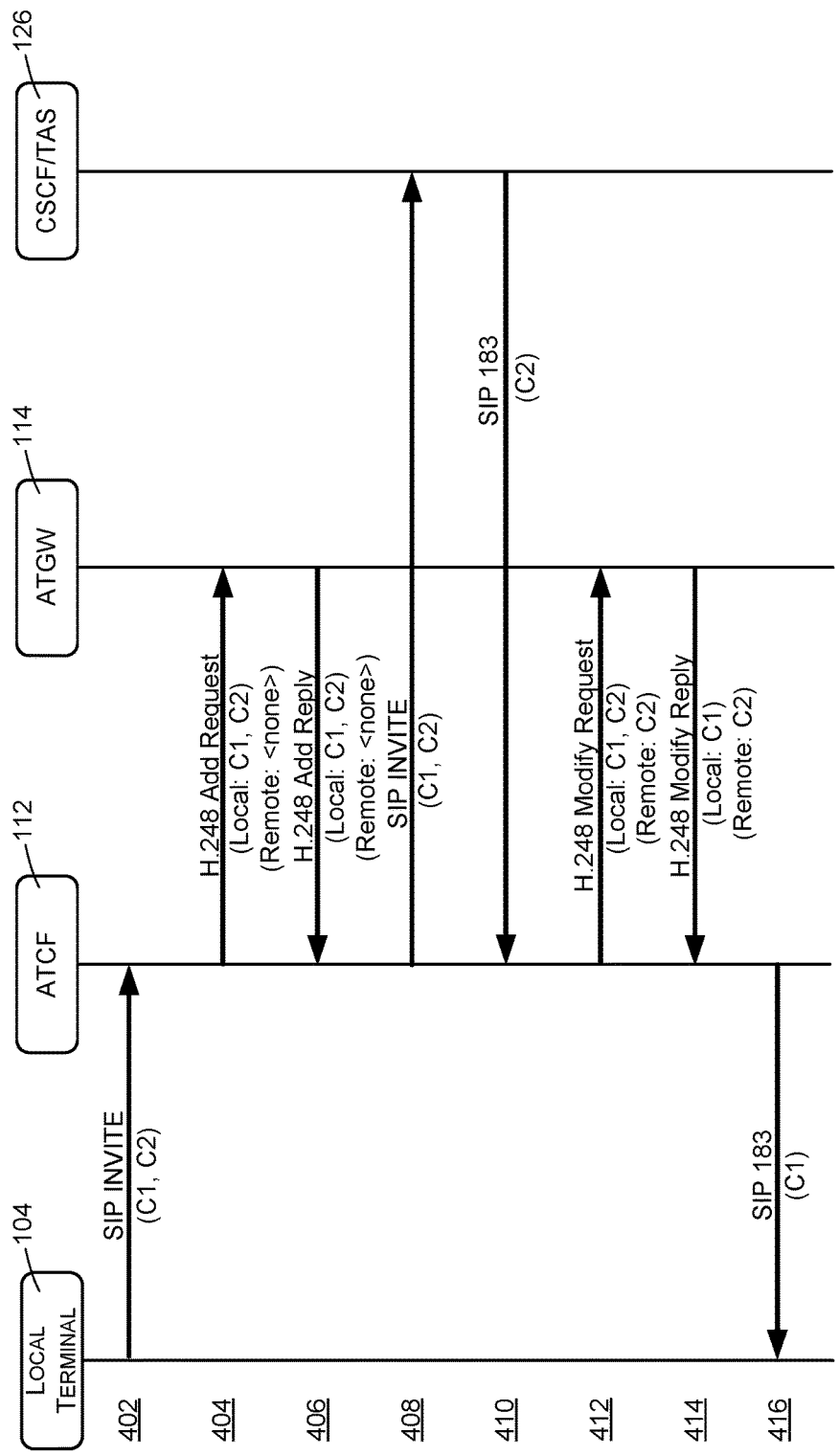

FIG. 4 illustrates communications when initiating a mobile originating call, in situations where (a) the remote terminal 108 does not support C1, (b) the remote terminal 108 does support C2, and (b) resource loading is below the threshold.

Communications 402, 404, 406, and 408 are the same as the communications 302, 304, 306, and 308 of FIG. 3. However, at 410, the SIP 183 message from the CSCF/TAS 126 specifies that the non-prioritized codec C2 has been selected for media communications with the remote terminal 108. C2 may be selected, for example, when the remote terminal 108 does not support C1.

At 412, the ATCF sends an H.248 Modify request to the ATCF 112, specifying the local list, which is as yet unchanged and includes both C1 and C2. However, the remote list is modified to specify only C2, as indicated by the preceding SIP 183 message from the CSCF/TAS 126.

At 414, the ATCF 112 returns a Modify reply to the ATCF 112. In this case, the local list has been modified by removing C2, and by specifying only C1. The remote list is left unchanged so that it contains only C2, honoring the selection received from the CSCF/TAS at 410. Because the local and remote codecs are different, transcoding will be performed during media transfer.

At 416, the ATCF 112 returns a SIP 183 message to the local terminal 104, specifying only C1, as an indication that C1 has been selected for communications between the ATGW 114 and the local terminal 104.

Figure 5:
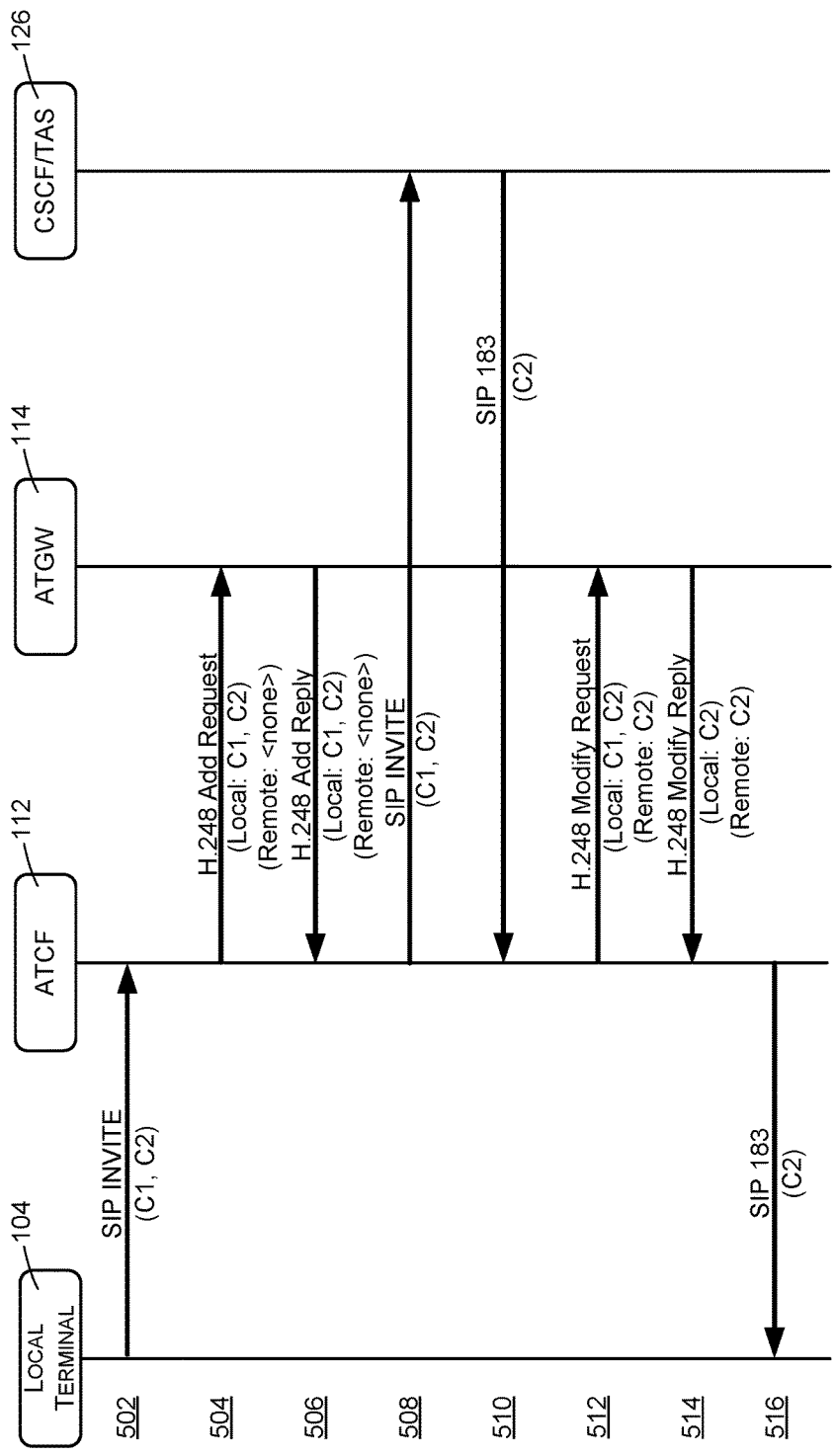

FIG. 5 illustrates communications when initiating a mobile originating call, in situations where (a) the remote terminal 108 does not support C1, (b) the remote terminal 108 does support C2, and (b) resource loading is greater than the threshold.

Communications 502, 504, 506, 508, 510, and 512 are the same as the communications 402, 404, 406, 408, 410, and 412 of FIG. 4. At 514, however, the H.248 reply from the ATCF 112 specifies that the ATCF 112 has selected C2 for both local and remote communications. Accordingly, at 516, the SIP 183 message from the ATCF 112 to the local terminal 104 specifies that the non-prioritized codec C2 has been selected for use by the local terminal 104.

Figure 6:
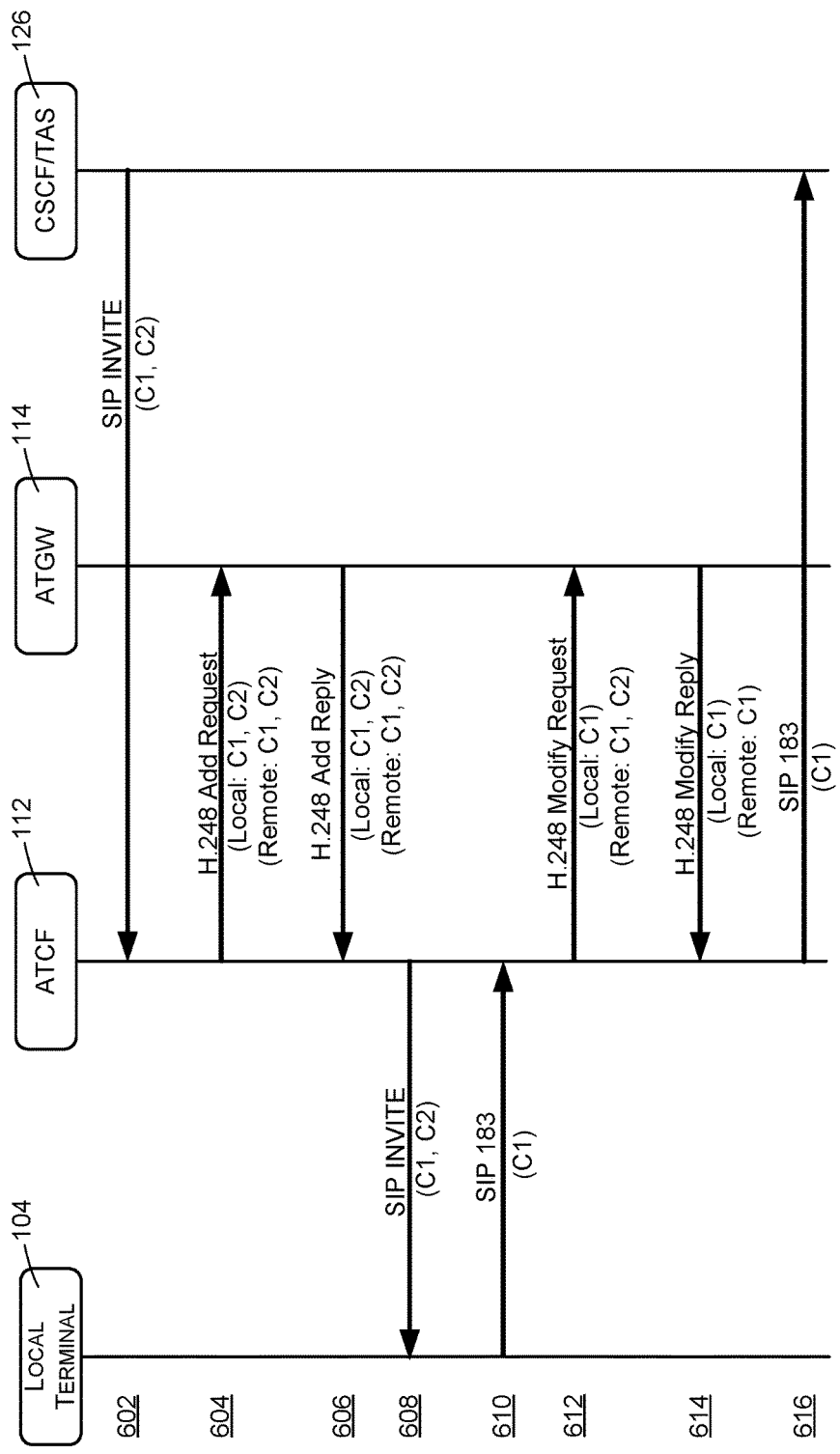

FIG. 6 illustrates communications when initiating a mobile terminating call, in situations where (a) the remote terminal 108 supports the prioritized codec C1 and (b) resource loading is greater than, equal to, or less than the threshold. Although not indicated in FIG. 6, the remote terminal 108 may in some instances also support the non-prioritized codec C2 and/or other non-prioritized codecs.

At 602, the ATCF 112 receives a (SIP) INVITE request from the remote terminal 108 through the CSCF/TAS 126. The SIP INVITE request specifies that the remote terminal 108 supports both C1 and C2. For example, the SIP INVITE may have an SDP payload that specifies C1 and C2 as media attributes. In response to the SIP INVITE, the remote terminal 108 expects a SIP response specifying a selection of one of the offered codecs.

The ATCF 112 responds at 604 by sending an H.248 Add request to the ATCF 112 to specify terminations for the call. The Add request includes a list that enumerates the codecs offered by or selected for the local terminal 104 the codecs offered by or selected for the remote terminal 108. In this case, the list for the local terminal 104 includes C1 and C2. The list for the remote terminal 108 also specifies C1 and C2, as specified by the preceding SIP INVITE.

At 606, the ATCF 112 responds with an H.248 Add reply that returns the enumerated local and remote lists as they were received, unchanged. That is, the local list specifies C1 and C2 and the remote list specifies C1 and C2.

At 608, the ATCF 112 forwards the SIP INVITE to the local terminal 104, again specifying the codecs C1 and C2 that were indicated as being supported by the remote terminal 108. The presence of both C1 and C2 in the SIP INVITE indicates that either C1 or C2 can be used for communications between the serving network and the local terminal. At 610, the local terminal 104 in reply sends a SIP 183 message to the ATCF 112, specifying the single codec that has been selected for communications through the remote network 106 with the remote terminal 108. In this example, the SIP 183 message specifies C1, which is the best available codec supported by the local terminal 104.

At 612, the ATCF sends an H.248 Modify request to the ATCF 112, specifying the local list, which now contains only C1 as indicated by the SIP 183 from the local terminal 104. The remote list specifies C1 and C2.

At 614, the ATCF 112 returns an H.248 Modify reply to the ATCF 112. In this case, the remote list has been modified by removing C2, and by specifying only C1. The local list is left unchanged so that it contains only C1, honoring the selection received from the local terminal 104.

At 616, the ATCF 112 returns a SIP 183 message to the CSCF/TAS 126, specifying only C1, as an indication that C1 has been selected for communications between the ATGW 114 and the remote terminal 108.

Figure 7:
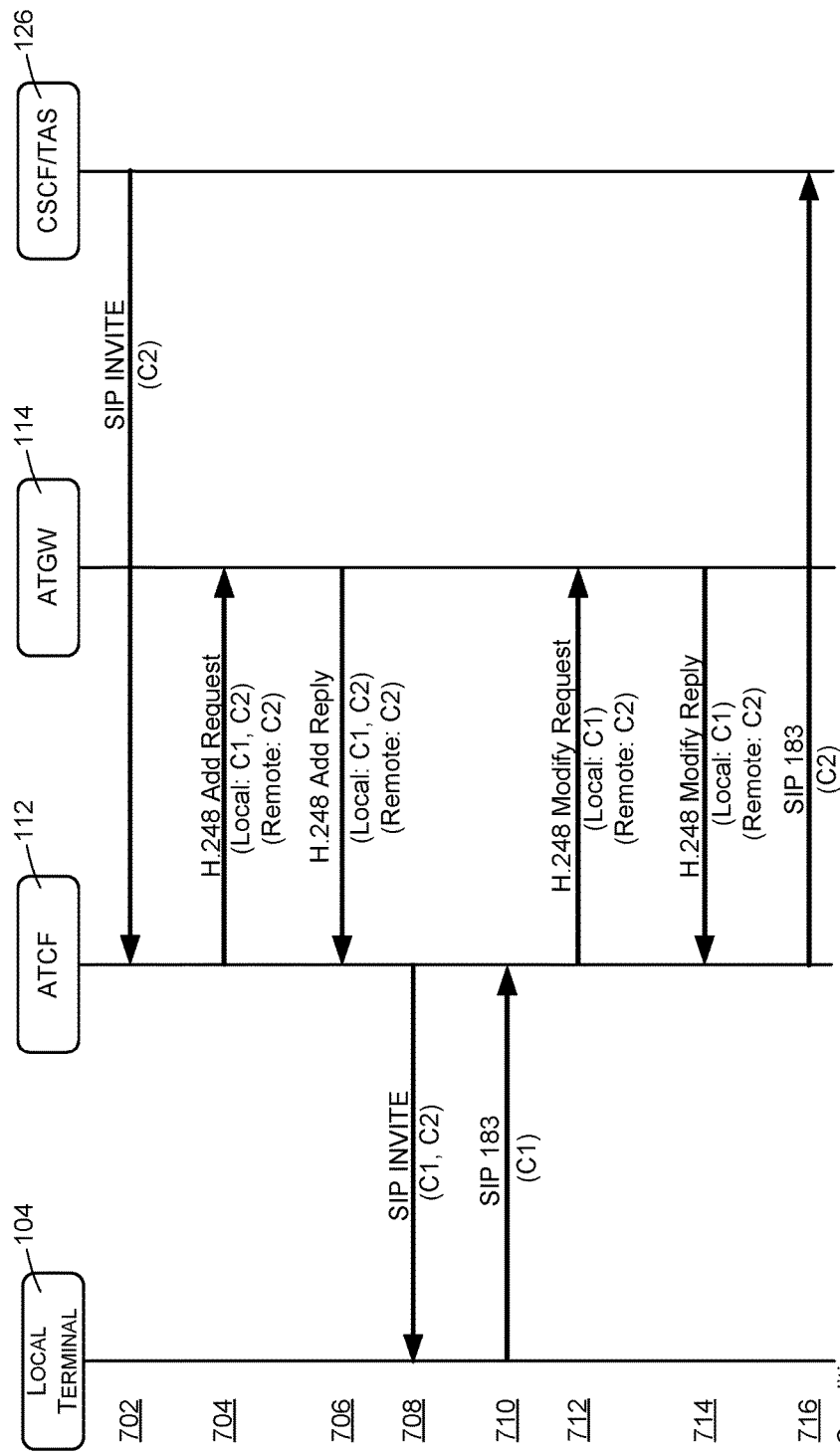

FIG. 7 illustrates communications when initiating a mobile terminating call, in situations where (a) the remote terminal 108 does not support C1, (b) the remote terminal 108 does support C2, and (b) resource loading is less than the threshold.

At 702, the ATCF 112 receives a SIP INVITE request from the remote terminal 108 through the CSCF/TAS 126. The SIP INVITE request specifies that the remote terminal 108 supports C2. In response to the SIP INVITE, the remote terminal 108 expects a SIP response specifying that C2 has been selected for communications between the ATF 112 and the remote terminal 108.

The ATCF 112 responds at 704 by sending an H.248 Add request to the ATCF 112 to specify terminations for the call. The Add request includes a list that enumerates the codecs offered by or selected for the local terminal and the codecs offered by or selected for the remote terminal 108. In this case, the list for the local terminal 104 includes C1 and C2. The list for the remote terminal 108 specifies C2, as specified by the preceding SIP INVITE.

At 706, the ATCF 112 responds with an H.248 Add reply that returns the enumerated local and remote lists as they were received, unchanged. That is, the local list specifies C1 and C2 and the remote list specifies C2.

At 708, the ATCF 112 forwards the SIP INVITE to the local terminal 104, again specifying the codecs C1 and C2 as indicated by the Add reply at 706.

At 710, the local terminal 104 in reply sends a SIP 183 message to the ATCF 112, specifying the single codec that has been selected for communications through the remote network 106 with the remote terminal 108. In this example, the SIP 183 message specifies C1, which is the best available codec supported by the local terminal 104.

At 712, the ATCF sends an H.248 Modify request to the ATCF 112, specifying the local list, which now contains only C1 as indicated by the SIP 183 message from the local terminal 104. The remote list specifies C2, as indicated by the SIP INVITE at 702.

At 714, the ATCF 112 returns an H.248 Modify reply to the ATCF 112. In this case, the local list is left unchanged so that it contains only C1, honoring the selection received from the local terminal 104. The remote list is also left unchanged, honoring the selection received from the remote terminal 108 at 702.

At 716, the ATCF 112 returns a SIP 183 message to the CSCF/TAS 126, specifying only C2, as an indication that C2 has been selected for communications between the ATGW 114 and the remote terminal 108.

The ATGW 114 will transcode between C1 and C2 in this example.

Figure 8:
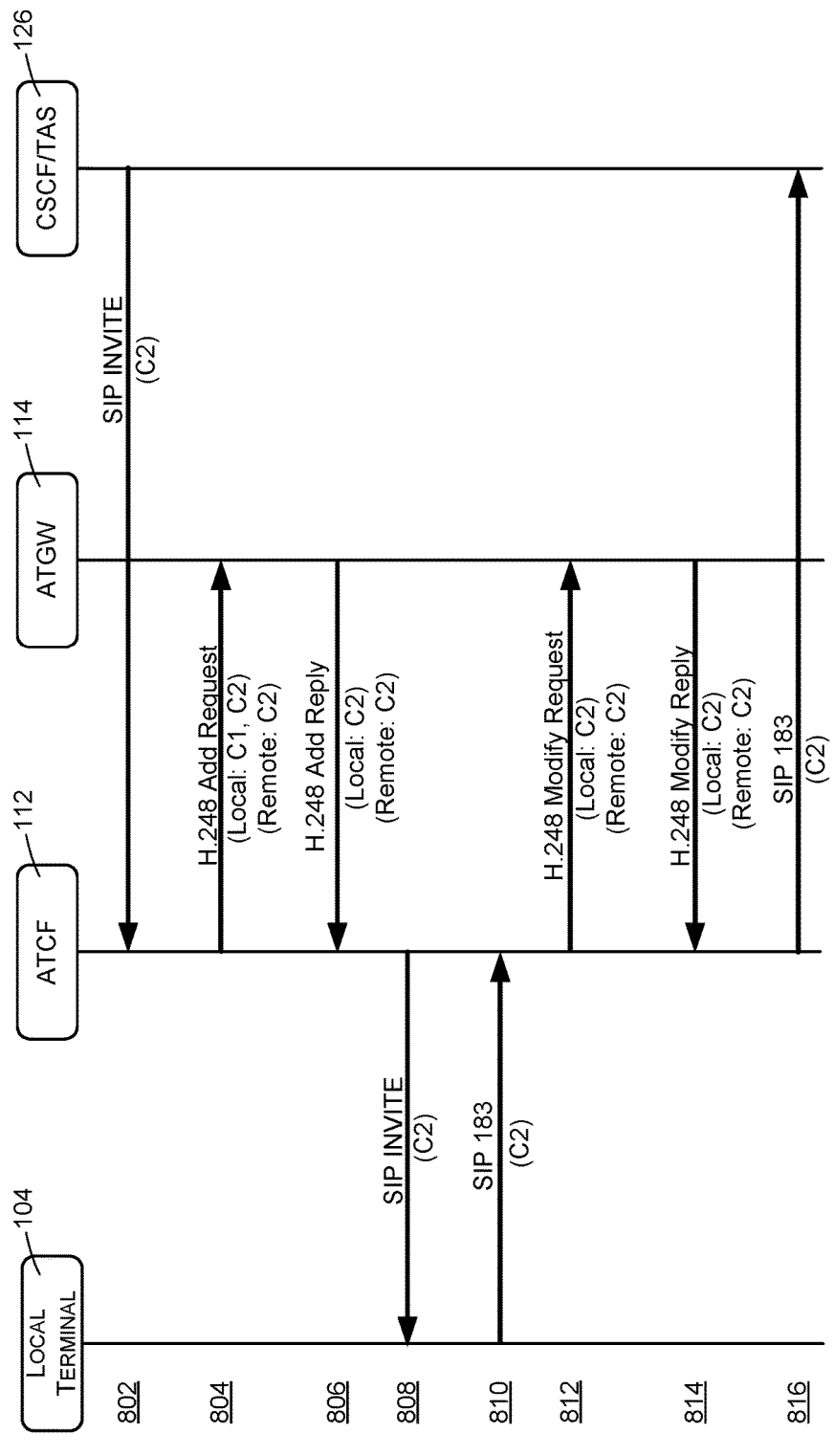

FIG. 8 illustrates communications when initiating a mobile terminating call, in situations where (a) the remote terminal 108 does not support C1, (b) the remote terminal 108 does support C2, and (b) resource loading is greater than or equal to the threshold.

At 802, the ATCF 112 receives a SIP INVITE request from the remote terminal 108 through the CSCF/TAS 126. The SIP INVITE request specifies that the remote terminal 108 supports C2. In response to the SIP INVITE, the remote terminal 108 expects a SIP response specifying that C2 has been selected for communications between the ATCF 112 and the remote terminal 108.

The ATCF 112 responds at 804 by sending an H.248 Add request to the ATCF 112 to specify terminations for the call. The Add request includes a list that enumerates the codecs offered by or selected for the local terminal 104 and the codecs offered by or selected for the remote terminal 108. In this case, the list for the local terminal 104 includes C1 and C2. The list for the remote terminal 108 specifies C2, as specified by the preceding SIP INVITE.

At 806, the ATCF 112 responds with an H.248 Add reply that returns the enumerated local and remote lists after removing C1 from the local list. That is, the local list specifies C2 and the remote list specifies C2.

At 808, the ATCF 112 forwards the SIP INVITE to the local terminal 104, specifying the codec C2 as indicated by the Add reply at 806.

At 810, the local terminal 104 in reply sends a SIP 183 message to the ATCF 112, specifying the single codec that has been selected for communications with the local terminal 104. In this example, the SIP 183 message specifies C2, which is codec previously selected by the remote terminal 108.

At 812, the ATCF sends an H.248 Modify request to the ATCF 112, specifying the local list, which now contains only C2 as indicated by the SIP 183 message from the local terminal 104. The remote list specifies C2, as indicated by the SIP INVITE at 802.

At 814, the ATCF 112 returns an H.248 Modify reply to the ATCF 112. In this case, the local list is left unchanged so that it contains only C1, honoring the selection received from the local terminal 104. The remote list is also left unchanged, honoring the selection of C2 received from the remote terminal 108 at 802.

At 816, the ATCF 112 returns a SIP 183 message to the CSCF/TAS 126, specifying only C2, as an indication that C2 has been selected for communications between the ATGW 114 and the remote terminal 108.

Figure 9:
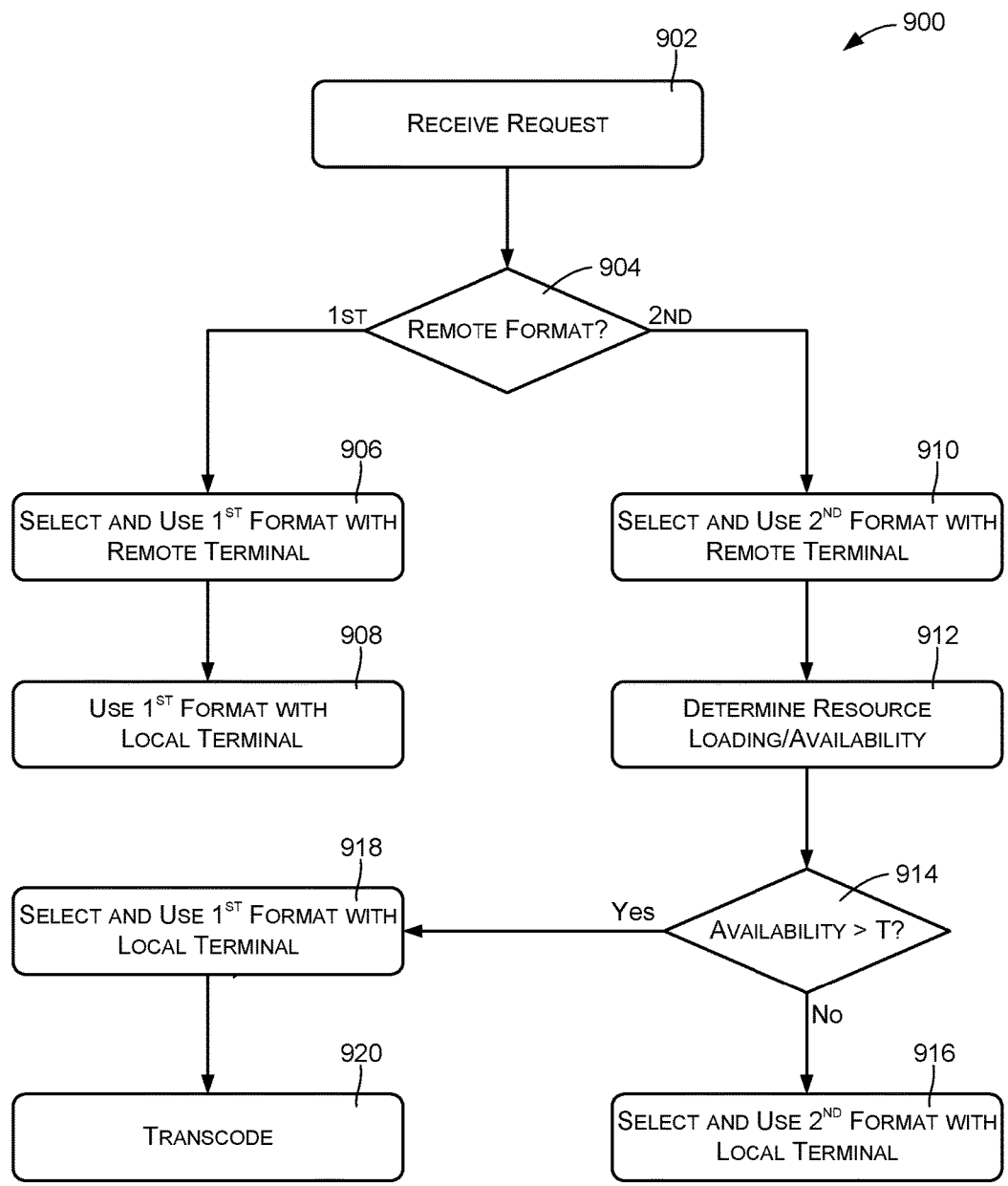
FIG. 9 is a flow diagram illustrating another example method of selecting codecs for local and remote communication terminals.

FIG. 9 illustrates an example method 900 that may be performed by a serving network to select and use coding methods and corresponding codecs for a first communication terminal and a second communication terminal, where the first communication terminal is served by the serving network. For purposes of discussion, the first communication terminal will be referred to as a local terminal and the second communication terminal will be referred to as a remote terminal. It is assumed that each coding format corresponds to a respective codec, and that specifying, using, offering, indicating, or selecting a coding method is equivalent to specifying, using, offering, indicating, or selecting a corresponding codec.

An action 902 comprises receiving a request for a media call or session between the local terminal and the remote terminal. The request may be received from the local terminal or the remote terminal. In the described embodiment, the request comprises a SIP INVITE message specifying the coding methods that are supported by the sender of the request. In the example of FIG. 9, it is assumed that the local terminal is capable of encoding and decoding data streams that are in a prioritized media coding format, and data streams that are in an other, non-prioritized media coding format. The prioritized and non-prioritized media coding formats will be referred to more generally as $1^{st}$ and $2^{nd}$ coding formats, respectively, in the following discussion.

The media call may comprise an audio call, a video call, or any other type of session in which streaming data is transferred between the local and remote terminals. The coding formats may correspond to audio codecs, video codecs, or codecs corresponding to different types of coding formats, depending on the nature of the media call.

An action 904 comprises determining which coding format will be used for communicating media, such as audio of an audio call, with the remote terminal. In many cases, the coding format used for communicating audio with the remote terminal will be selected as the best or most highly prioritized coding format supported by the remote terminal. In cases where the remote terminal initiates the call, the remote terminal may offer one or more coding formats in a SIP INVITE request, and the serving network can select between the offered coding formats. In some cases, the SIP INVITE message may indicate that the remote terminal supports both the $1^{st}$ and $2^{nd}$ coding formats. In other cases, the SIP INVITE message will not indicate the remote terminal supports the $1^{st}$ coding method, but may indicate that the remote terminal does support the $2^{nd}$ coding format.

In cases where the local terminal initiates the call, the SIP INVITE request may specify that the local terminal supports both the $1^{st}$ and $2^{nd}$ coding format. In this case, the serving network may query the remote terminal and provide an offer of one or more coding formats, and remote terminal can select between the offered coding formats.

Actions 906 and 908 are performed in response to determining that the $1^{st}$ coding format or codec will be used for communicating with the remote terminal. The action 906 comprises selecting the $1^{st}$ coding format for communications with the local terminal and subsequently communicating media of the media call with the local terminal using the $1^{st}$ coding format. The action 908 comprises communicating media of the media call with the remote terminal using the $1^{st}$ coding format.

Actions 910, 912, and 914 are performed in response to determining that the $2^{nd}$ coding format will be used for communicating with the remote terminal. The action 910 comprises communicating media of the media call with the remote terminal using the $2^{nd}$ coding format or causing a corresponding $2^{nd}$ coding format to be used in communicating media of the media call with the remote terminal.

The action 912 comprises determining an amount of computational resources that are available for media data stream encoding. The action 912 may include querying elements of the access transfer function 110 to determine processor loads, memory usage, etc.

The action 914 comprises determining whether the amount of available computational resources is greater than a threshold T. The threshold T may be predetermined in a manner such that proactive encoding does not threaten to overwhelm the available computational resources. As an example, the threshold T may be set to 20% of the total load capacity of the computational resources.

An action 916 is performed in response to determining that the amount of available computational resources is not greater than the threshold T. The action 916 comprises selecting the $2^{nd}$ coding format for communications with the local terminal and subsequently communicating media of the media call with the local terminal using the $2^{nd}$ coding format. Transcoding is not needed in this case.

Actions 918 and 920 are performed in response to determining that the amount of available computational resources is greater than the threshold T. The action 918 comprises selecting the $1^{st}$ coding format for communications with the local terminal and subsequently communicating media of the media call with the local terminal using the $1^{st}$ coding format. In some cases, the action 918 may comprise sending a SIP INVITE message to the local terminal, indicating to the local terminal that the $1^{st}$ codec can be selected. The action 918 may include indicating to the local terminal in a SIP INVITE message that the $1^{st}$ coding format can be used for communicating media of the media call. As described above, the SIP INVITE may specify media attributes, and the media attributes may specify the $1^{st}$ coding format.

The action 920 comprises transcoding between the $1^{st}$ and $2^{nd}$ coding formats, using corresponding $1^{st}$ and $2^{nd}$ codecs and using at least a portion of the available computational resources.

Figure 10:
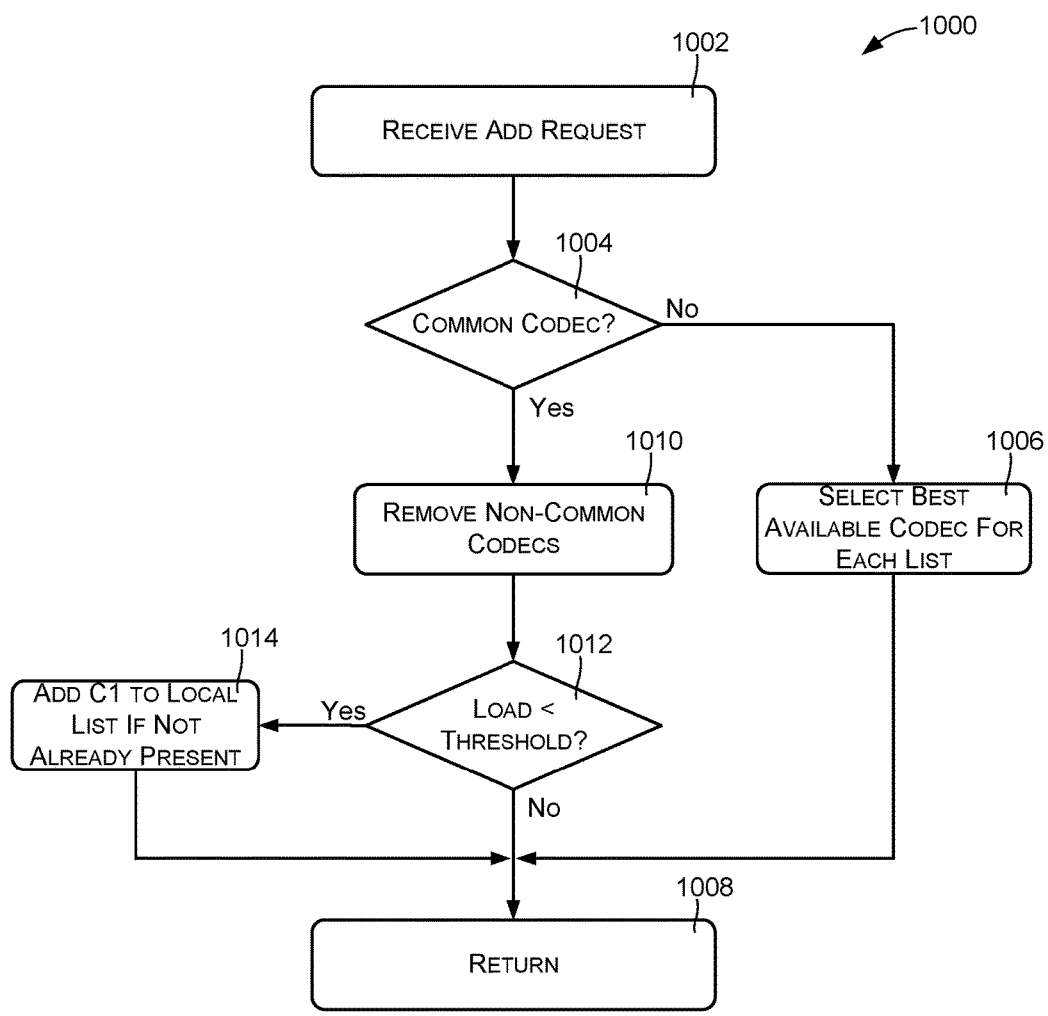
FIG. 10 is a flow diagram illustrating an example method that may be performed by an ATGW (Access Transfer Gateway) when responding to add requests.

FIG. 10 illustrates an example method 1000 that may be performed by the ATCF 112 for processing an Add request, such as the H.248 Add request referenced in the discussion above.

An action 1002 comprises receiving an Add request. As indicated above, the Add request specifies the codecs that the local terminal 104 has selected or offered and the codecs that have been selected or offered for use in communicating with the remote terminal 108, referred to as the local list and the remote list, respectively.

An action 1004 comprises determining whether there are one or more codecs that are common to both of the local and remote lists. If there are no common codecs, an action 1006 is performed of selecting the best available codec for each of the local and remote lists, and removing any other codecs from the lists. More specifically, the action 1006 comprises determining the best available codec specified by the local list and removing other codecs from the local list, and determining the best available codec specified by the remote list and removing other codecs from the remote list.

An action 1008 is then performed of returning the modified local and remote lists.

Given a set of codecs that have been prioritized relative to each other in terms of desirability, the best codec is the codec that has the highest priority. If the prioritized codec C1 is present, it will generally be the best available codec because it has the highest priority.

If there are one or more common codecs, an action 1010 is performed of removing any non-common codecs from the local and remote lists. An action 1012 is then performed of determining whether the current load on computational resources is less than a predetermined threshold. If the load is not less than the threshold, the action 1008 is performed of returning the modified local and remote lists.

In response to determining that the load is less than the threshold, an action 1004 is performed of adding the prioritized codec C1 to the local list. The modified local and remote lists are then returned in the action 1008.

Figure 11:
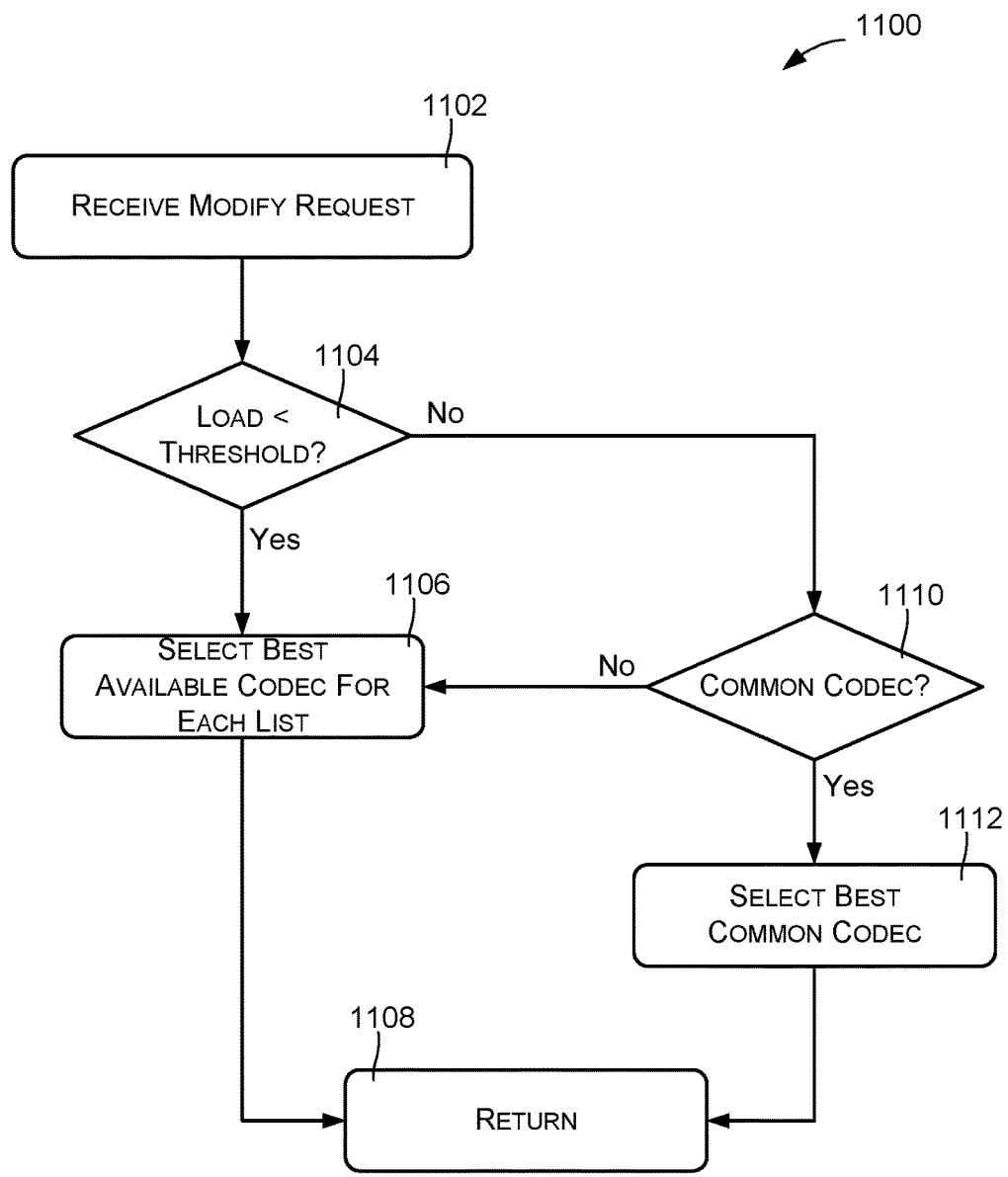
FIG. 11 is a flow diagram illustrating an example method that may be performed by the ATGW when responding to modify requests.

FIG. 11 illustrates an example method 1100 that may be performed by the ATCF 112 for processing a Modify request, such as the H.248 Modify request referenced in the discussion above.

An action 1102 comprises receiving a Modify request. As indicated above, the Modify request includes a local list and a remote list, specifying the codecs that have been determined or specified as being available for the local and remote terminals respectively.

An action 1104 is then performed of determining whether the current load on computational resources is less than a predetermined threshold. If the load is less than the threshold, an action 1106 is performed of selecting the best available codec for each of the local and remote lists, and removing any other codecs from the lists. An action 1108 is then performed of returning the modified local and remote lists.

If the load is not less than the threshold, an action 1110 is performed of determining whether there are one or more codecs that are common to both of the local and remote lists. If there are no common codecs, the action 1106 is performed of selecting the best available codec for each of the local and remote lists, and removing any other codecs from the lists. The action 1108 is then performed of returning the modified local and remote lists.

If there exists at least one common codec between the local and remote lists, an action 1112 is performed of selecting the best of the common codecs and removing any other codecs from the local and remote lists. The modified local and remote lists are then returned in the actions 1108.

Figure 12:
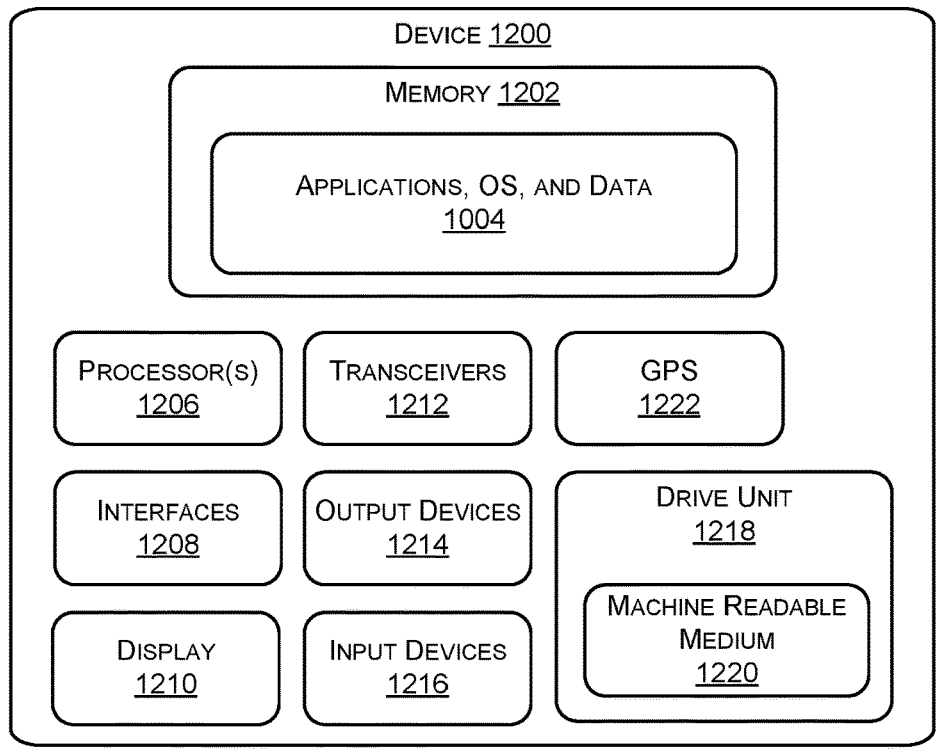
FIG. 12 is a block diagram of an example communication terminal that may be configured to implement the techniques described herein.

Although the description above references a single load threshold, the decision actions involving the threshold may in practice use an upper value and a lower value. When the load is already above the upper value, the decision actions are in relation to the lower value as a threshold. When the load is already below the lower value, the decision actions are in relation to the higher value as the threshold. FIG. 12 illustrates an example communication device 1200 in accordance with various embodiments. The device 1200 is illustrative of a communication terminal, such as the communication terminals 104 and 108 of FIG. 1.

The device 1200 may include a memory 1202, which may store applications, an operating system (OS), and data 1204. The device 1200 further includes processor(s) 1206, interfaces 1208, a display 1210, radio transceivers 1212, output devices 1214, input devices 1216, and a drive unit 1218 including a machine readable medium 1220.

In various embodiments, the memory 1202 includes both volatile memory and non-volatile memory. The memory 1202 can also be described as non-transitory computer storage media and may include removable and non-removable media implemented in any method or technology for storage of information, such as computer readable instructions, data structures, program modules, or other data. The applications, OS, and data 1204 are stored in the memory 1202. Additionally, in some embodiments, the memory 1202 may include a SIM (subscriber identity module), which is a removable smart card used to identify a user of the device 1200 to a service provider network.

Non-transitory computer-readable media may include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible, physical medium which can be used to store the desired information and which can be accessed by the device 1200. Any such non-transitory computer-readable media may be part of the device 1200.

In some embodiments, the processor(s) 1206 is a central processing unit (CPU), a graphics processing unit (GPU), or both CPU and GPU, or other processing unit or component known in the art.

In various embodiments, the interfaces 1208 are any sort of interfaces known in the art. The interfaces 1208 may include any one or more of an Ethernet interface, wireless local-area network (WLAN) interface, a near field interface, a DECT chipset, or an interface for an RJ-11 or RJ-45 port. A wireless LAN interface can include a Wi-Fi interface or a Wi-Max interface, or a Bluetooth interface that performs the function of transmitting and receiving wireless communications using. The near field interface can include a Bluetooth® interface or radio frequency identifier (RFID) for transmitting and receiving near field radio communications via a near field antenna. For example, the near field interface may be used for functions, as is known in the art, such as communicating directly with nearby devices that are also, for instance, Bluetooth® or RFID enabled.

In various embodiments, the display 1210 may comprise a liquid crystal display or any other type of display commonly used in telecommunication devices or other portable devices. For example, the display 1210 may be a touch-sensitive display screen, which may also act as an input device or keypad, such as for providing a soft-key keyboard, navigation buttons, or the like.

In some embodiments, the transceivers 1212 include any sort of transceivers known in the art. For example, the transceivers 1212 may include radio radios and/or radio transceivers and interfaces that perform the function of transmitting and receiving radio frequency communications via an antenna, through a cellular communication network of a wireless data provider. The radio interfaces facilitate wireless connectivity between the device 1300 and various cell towers, base stations and/or access points.

In some embodiments, the output devices 1214 include any sort of output devices known in the art, such as a display (already described as display 1210), speakers, a vibrating mechanism, or a tactile feedback mechanism. The output devices 1214 also include ports for one or more peripheral devices, such as headphones, peripheral speakers, or a peripheral display.

In various embodiments, the input devices 1216 include any sort of input devices known in the art. For example, the input devices 1216 may include a microphone, a keyboard/keypad, or a touch-sensitive display (such as the touch-sensitive display screen described above). A keyboard/keypad may be a push button numeric dialing pad (such as on a typical telecommunication device), a multi-key keyboard (such as a conventional QWERTY keyboard), or one or more other types of keys or buttons, and may also include a joystick-like controller and/or designated navigation buttons, or the like.

The device 1200 may in some cases also have a GPS (global positioning system) receiver 1222 for determining the current location of the device 1200 based on signals received from satellites.

The machine readable medium 1220 stores one or more sets of instructions (e.g., software) such as a computer-executable program that embodies operating logic for implementing and/or performing any one or more of the methodologies or functions described herein as being performed by one of the communication terminals 104 and 108. The instructions may also reside, completely or at least partially, within the memory 1202 and within the processor 1206 during execution thereof by the device 1200.

Figure 13:
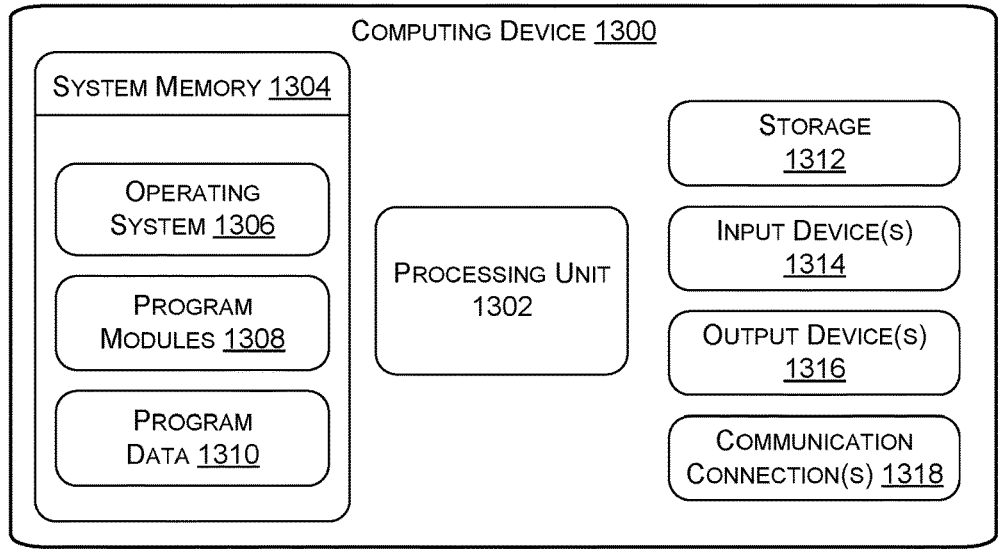
FIG. 13 is a block diagram of an example computing device that may be configured to implement various functionality of a communications network.

FIG. 13 is a block diagram of an illustrative computing device 1300 such as may be used to implement various components of the networks 102 and 106, such as servers, routers, gateways, administrative components, etc. One or more computing devices 1300 may be used to implement the access transfer function 110 and the network core 124, for example.

In various embodiments, the computing device 1300 may include at least one processing unit 1302 and system memory 1304. Depending on the exact configuration and type of computing device, the system memory 1304 may be volatile (such as RAM), non-volatile (such as ROM, flash memory, etc.) or some combination of the two. The system memory 1304 may include an operating system 1306, one or more program modules 1308, and may include program data 1310.

The computing device 1300 may also include additional data storage devices (removable and/or non-removable) such as, for example, magnetic disks, optical disks, or tape. Such additional storage is illustrated in FIG. 13 by storage 1312.

Non-transitory computer storage media of the computing device 1300 may include volatile and nonvolatile, removable and non-removable media implemented in any method or technology for storage of information, such as computer readable instructions, data structures, program modules, or other data. The system memory 1304 and storage 1312 are all examples of computer-readable storage media. Non-transitory computer-readable storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 1300. Any such non-transitory computer-readable storage media may be part of the computing device 1000.

In various embodiment, any or all of the system memory 1304 and storage 1312 may store programming instructions which, when executed, implement some or all of the function functionality described above as being implemented by components of the networks 102 and 106, such as the access transfer function 110 and the CSCF/TAS 126.

The computing device 1300 may also have input device(s) 1314 such as a keyboard, a mouse, a touch-sensitive display, voice input device, etc. Output device(s) 1316 such as a display, speakers, a printer, etc. may also be included. The computing device 1300 may also contain communication connections 1318 that allow the device to communicate with other computing devices.

Although features and/or methodological acts are described above, it is to be understood that the appended claims are not necessarily limited to those features or acts. Rather, the features and acts described above are disclosed as example forms of implementing the claims.

What is claimed is:

1. A method, comprising:
   receiving a request for an audio call between a first audio terminal and a second audio terminal, wherein the first audio terminal is capable of (a) encoding and decoding audio data streams that are in a prioritized audio coding format and (b) encoding and decoding audio data streams that are in an other audio coding format;
   determining that the other audio coding format will be used for communicating audio of the audio call with the second audio terminal;
   in response to determining that the other audio coding format will be used for communicating the audio of the audio call with the second audio terminal, communicating the audio of the audio call with the second audio terminal using the other audio coding format;
   determining an amount of computational resources that are available for audio data stream transcoding;
   determining that the amount is greater than a threshold;
   in response to determining that the amount is greater than the threshold:
   (a) communicating the audio of the audio call with the first audio terminal using the prioritized audio coding format; and (b) using at least a portion of the computational resources to transcode between the prioritized audio coding format and the other audio coding format.

2. The method of claim 1, wherein the request is received from the first audio terminal.

3. The method of claim 2, wherein the request specifies that the first audio terminal supports the prioritized audio coding format and the other coding format.

4. The method of claim 3, wherein the request comprises a SIP INVITE.

5. The method of claim 1, wherein:
the request is received from the second audio terminal;
the request specifies that the other coding format can be used for communicating the audio of the audio call; and
the request does not specify that the prioritized audio coding format can be used for communicating the audio of the audio call.

6. The method of claim 5, further comprising, in further response to determining that the amount is greater than the threshold, indicating to the first audio terminal that the prioritized audio coding format can be used for communicating the audio of the audio call.

7. The method of claim 6, wherein indicating to the first audio terminal that the prioritized audio coding format can be used for communicating the audio of the audio call comprises sending a SIP INVITE to the first audio terminal, wherein the SIP INVITE specifies the prioritized audio coding format.

8. One or more non-transitory computer storage media with a stored computer-executable program, which, when executed by one or more processors of a first device, performs actions comprising:
receiving a request for an audio call between a first audio terminal and a second audio terminal, wherein the first audio terminal supports a first codec and a second codec;
determining that the second codec will be used in communicating audio of the audio call with the second audio terminal;
determining that there is at least a threshold level of computational resources available for audio data stream transcoding; and
in response to determining that there is at least a threshold level of computational resources available for audio data stream transcoding:
(a) causing the first codec to be used in communicating audio of the audio call with the first audio terminal; and
(b) transcoding an audio stream of the audio call using the first codec and the second codec.

9. The one or more non-transitory computer storage media of claim 8, wherein the request is received from the first audio terminal.

10. The one or more non-transitory computer storage media of claim 9, wherein the request specifies that the first audio terminal supports the first codec and the second codec.

11. The one or more non-transitory computer storage media of claim 10, wherein the request comprises a SIP INVITE.

12. The one or more non-transitory computer storage media of claim 8, wherein:

the request is received from the second audio terminal; and
the request does not specify that the second audio terminal supports the first codec.

13. The one or more non-transitory computer storage media of claim 12, the actions further comprising, in further response to determining that there is at least the threshold level of computational resources available for audio data stream transcoding, indicating to the first audio terminal that the first codec can be selected for the audio call.

14. The one or more non-transitory computer storage media of claim 13, wherein indicating to the first audio terminal that the first codec can be selected for the audio call comprises sending a SIP INVITE to the first audio terminal, wherein the SIP INVITE specifies the first codec.

15. One or more devices, comprising:
one or more processors;
one or more non-transitory computer-readable media storing computer-executable instructions that, when executed on the one or more processors, cause the one or more processors to perform actions comprising:
receiving a request to anchor a session between a first communication terminal and a second communication terminal, wherein the first communication terminal supports a first codec and a second codec;
determining that the second codec will be used for media communications with the second communication terminal;
determining that there is at least a threshold level of computational resources available for media stream transcoding;
in response to determining that there is at least a threshold level of computational resources available for media stream transcoding:
(a) causing the first codec to be used for media communications with the first communication terminal; and
(b) transcoding a media stream of the session using the first codec and the second codec.

16. The one or more devices of claim 15, wherein the request is received from the first communication terminal.

17. The one or more devices of claim 16, wherein the request specifies that the first communication terminal supports the first codec and the second codec.

18. The one or more devices of claim 15, wherein:
the request is received from the second communication terminal; and
the request does not specify that the second communication terminal supports the first codec.

19. The one or more devices of claim 18, the actions further comprising, in further response to determining that there is at least a threshold level of computational resources available for media data stream transcoding, indicating to the first communications terminal that the first codec can be selected for the session.

20. The one or more devices of claim 15, further comprising an Access Transfer Control Function (ATCF) and Access Transfer Gateway (ATGW) of an IP Multimedia Subsystem (IMS).

* * * * *